(No Model.) 2 Sheets—Sheet 1.
C. P. CHRISTOPHER & R. B. ALEXANDER.
TETHER.
No. 263,388. Patented Aug. 29, 1882.
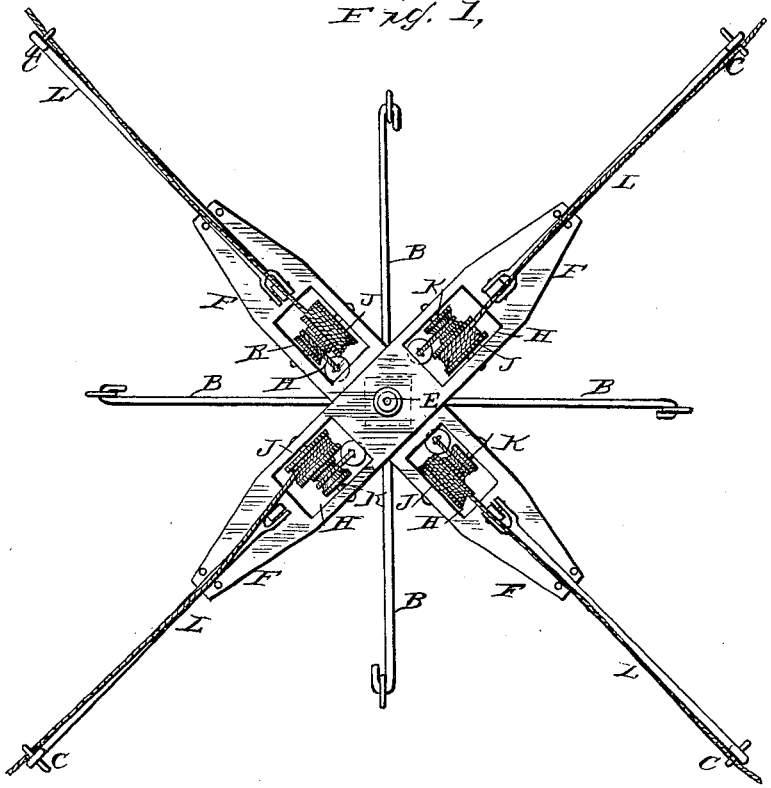
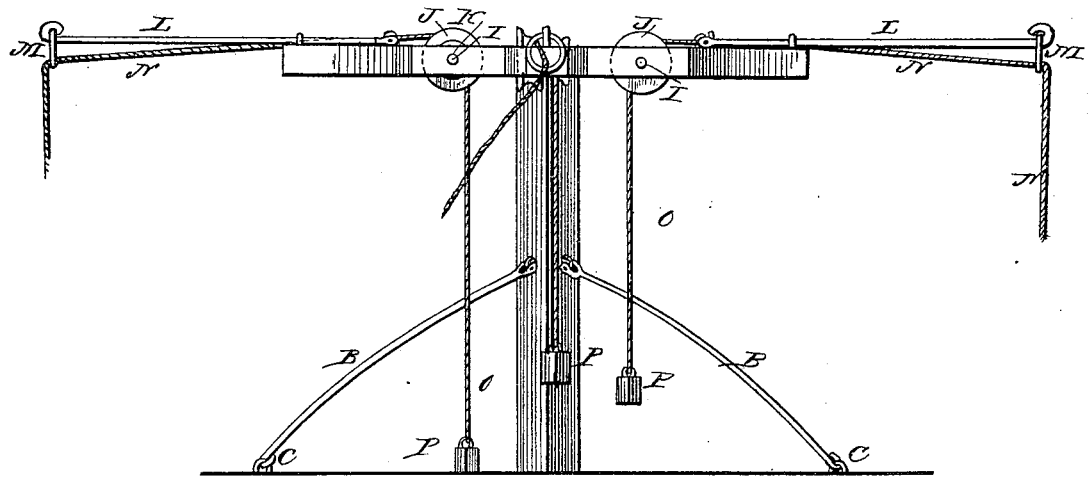
WITNESSES:
INVENTOR.
ATTORNEYS.

(No Model.) 2 Sheets—Sheet 2.
C. P. CHRISTOPHER & R. B. ALEXANDER.
TETHER.
No. 263,388. Patented Aug. 29, 1882.
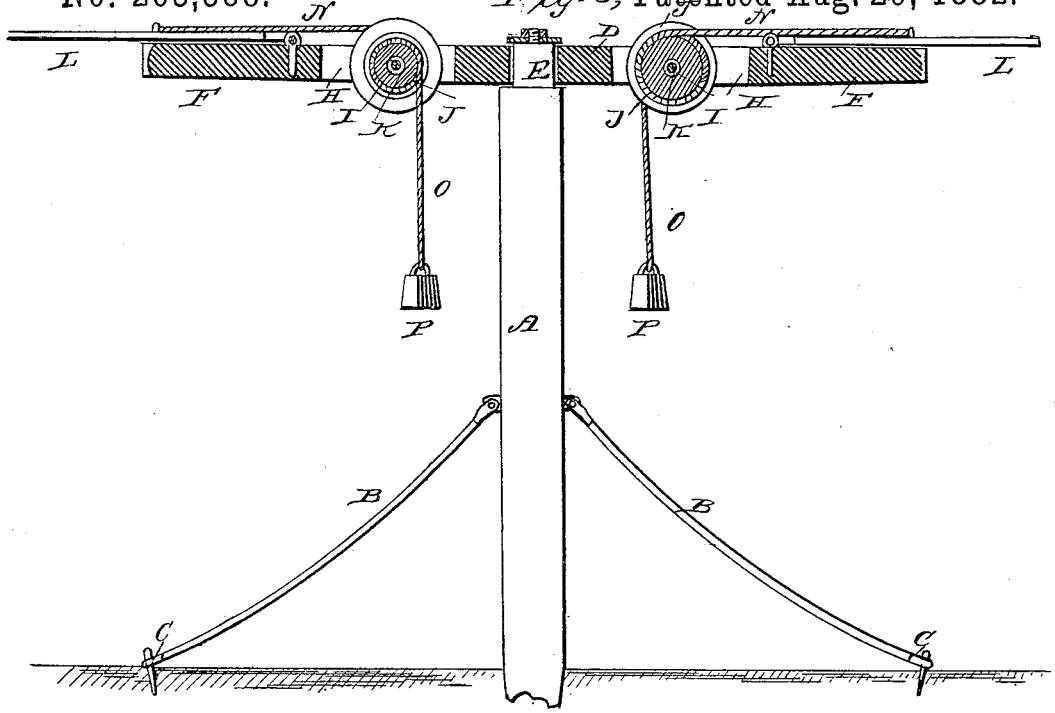
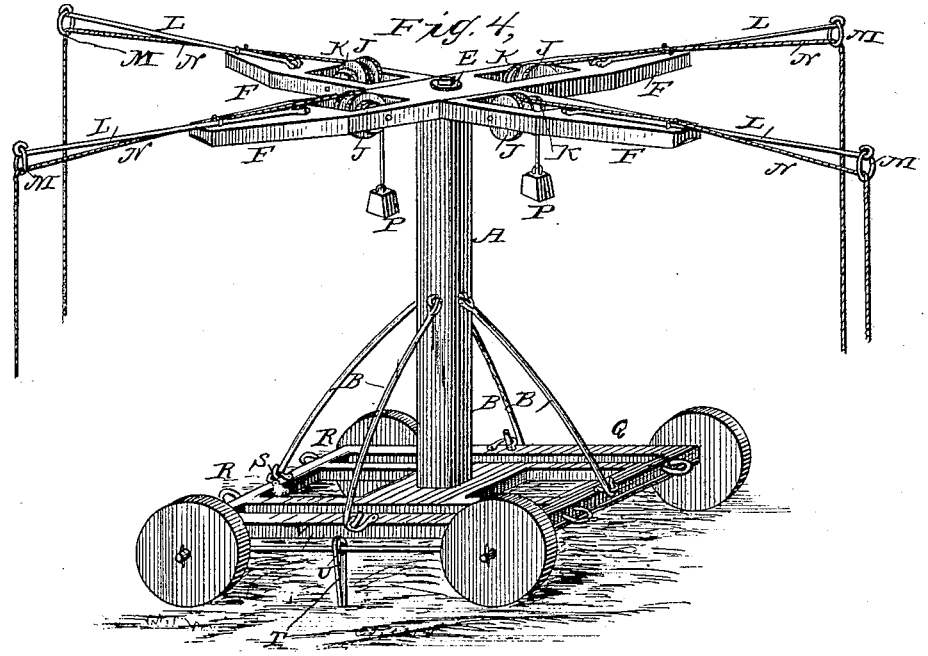
WITNESSES:
INVENTOR.
C. P. Christopher and
R. B. Alexander
by C. A. Snow & Co
ATTORNEYS.

UNITED STATES PATENT OFFICE.

CALVIN P. CHRISTOPHER AND ROBERT B. ALEXANDER, OF SPARTANBURG, SOUTH CAROLINA, ASSIGNORS TO SAID ALEXANDER.

TETHER.

SPECIFICATION forming part of Letters Patent No. 263,388, dated August 29, 1882.

Application filed June 19, 1882. (No model.)

*To all whom it may concern:*

Be it known that we, C. P. CHRISTOPHER and R. B. ALEXANDER, of Spartanburg, in the county of Spartanburg and State of South Carolina, have invented certain new and useful Improvements in Tethers; and we do hereby declare that the following is a full, clear, and exact description of the invention, which will enable others skilled in the art to which it appertains to make and use the same, reference being had to the accompanying drawings, which form a part of this specification.

Figure 1 is a plan view of our improved tether. Fig. 2 is a side view of the same. Fig. 3 is a vertical sectional view, and Fig. 4 is a view showing the device mounted on a truck.

Corresponding parts in the several figures are denoted by like letters of reference.

This invention relates to tethers for grazing cattle on unfenced pastures; and it consists in certain improvements in the construction of the same, which will be hereinafter fully described, and particularly pointed out in the claims.

In the drawings hereto annexed, A represents a post or upright of suitable dimensions, which is driven into the ground and is held securely in a vertical position by means of arms or braces B, hinged to the sides of post A, so as to be capable of being folded when not in use, and having hooks or eyes C in their outer or free ends to receive stakes, by which they may be secured when extended.

D is a horizontal revolving frame journaled to the upper end of post A, which may be turned down so as to form a spindle, E, for said frame. The frame D is composed mainly of four arms, F, projecting laterally at right angles to each other. Each arm F is provided with a slot, H, the sides of which form bearings for a transverse shaft, I, carrying a large and a small pulley, J K. Each arm is also provided with a hinged extension, L, which when not in use may be folded back upon the frame. The extensions or brackets L are provided at their outer ends with rings M.

N N are the tether-ropes, which are attached to and wound upon the large pulleys J. From thence they pass out over the extension-arms L and through the rings M. Other ropes, O, are attached to the small pulleys K, and are provided at their free ends with weights P, which hang down loosely.

The operation of our invention will be readily understood. When the tether-ropes are unwound the weight-ropes are wound upon their respective pulleys, and vice versa, thus keeping the ropes always taut.

Staples or eyes may be provided upon the arms F to guide the tether-ropes and prevent them from becoming tangled.

Instead of driving the stake or upright A into the ground, as shown in Figs. 1, 2, and 3 of the drawings, it may be mounted upon a suitably-constructed truck, (shown at Q in Fig. 4 of the drawings.) Said truck is provided at both ends with staples R, to which draft may be attached. It is also provided with loops or staples S, to which the hinged braces B may be connected. The truck Q may be anchored in any desired position by stakes T, driven into the ground, one on each side of the truck, and provided at their upper ends with eyes U, to receive cross-bars V, placed in said eyes and resting upon the axles of the truck.

Having thus described our invention, we claim and desire to secure by Letters Patent of the United States—

1. The revolving horizontal frame having arms F, provided with slots H, in which are journaled different-sized pulleys J K, in combination with the tether and weight ropes wound in opposite directions upon the respective pulleys, as set forth.

2. The revolving horizontal frame having arms F, provided with slots H, in which are journaled different-sized pulleys J K, said arms being provided with hinged extension-arms L, having rings M at their outer ends, in combination with the tether and weight ropes N O, wound in opposite directions upon the pulleys J K, respectively, as set forth.

3. The combination, with the post A, supporting the herein-described tethering device, and having hinged braces B, provided at their outer ends with hooks C, of the truck Q, having staples S, the stakes T, having eyes U, and the cross-bars V, all arranged substantially as set forth.

In testimony that we claim the foregoing as our own we have hereto affixed our signatures in presence of two witnesses.

CALVIN PHILMORE CHRISTOPHER.
   ROBERT BLACK ALEXANDER.

Witnesses:
 S. E. MASON,
 STEVEN ELLIOTT MASON,
 VANDIVER POSEY CARNEL.